(12) United States Patent
Barnett et al.

(10) Patent No.: US 7,435,401 B2
(45) Date of Patent: Oct. 14, 2008

(54) PSEUDOISOTHERMAL AMMONIA PROCESS

(75) Inventors: Daniel Joseph Barnett, Katy, TX (US); Richard Strait, Kingwood, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 401 days.

(21) Appl. No.: 10/884,323

(22) Filed: Jul. 2, 2004

(65) Prior Publication Data

US 2006/0002840 A1 Jan. 5, 2006

(51) Int. Cl.
*C01C 1/04* (2006.01)
(52) U.S. Cl. .................. 423/360; 422/148; 423/361
(58) Field of Classification Search ................. 423/360, 423/361, 659; 422/148, 177, 190
See application file for complete search history.

(56) References Cited

U.S. PATENT DOCUMENTS

| | | | | |
|---|---|---|---|---|
| 1,931,678 A | * | 10/1933 | Porter | 423/361 |
| 1,938,598 A | * | 12/1933 | Loud | 423/361 |
| 1,972,937 A | * | 9/1934 | Jaeger | 423/533 |
| 2,046,478 A | * | 7/1936 | O'Leary | 423/361 |
| 3,094,391 A | | 6/1963 | Mader | 48/127.9 |
| 4,055,628 A | | 10/1977 | McCarroll et al. | 423/448 |
| 4,122,040 A | | 10/1978 | McCarroll et al. | 502/184 |
| 4,163,775 A | | 8/1979 | Foster et al. | 423/363 |
| 4,230,669 A | | 10/1980 | Eagle et al. | 422/148 |
| 4,414,191 A | * | 11/1983 | Fuderer | 423/359 |
| 4,568,530 A | | 2/1986 | Mandelik et al. | 423/359 |
| 4,568,531 A | | 2/1986 | van Dijk et al. | 423/361 |
| 4,568,532 A | | 2/1986 | Benner et al. | 423/361 |
| 4,666,680 A | * | 5/1987 | Lewis | 422/191 |
| 4,696,799 A | | 9/1987 | Noe | 422/148 |
| 4,735,780 A | | 4/1988 | Noe | 422/148 |
| 4,867,959 A | * | 9/1989 | Grotz | 423/360 |
| 4,963,338 A | * | 10/1990 | Zardi et al. | 423/360 |
| 5,221,524 A | | 6/1993 | Eguchi | 422/189 |
| 5,250,270 A | | 10/1993 | Noe | 422/192 |
| 5,736,116 A | | 4/1998 | LeBlanc et al. | 423/359 |
| 5,997,834 A | * | 12/1999 | Udengaard et al. | 423/361 |
| 6,077,459 A | * | 6/2000 | Laursen et al. | 252/376 |
| 6,171,570 B1 | | 1/2001 | Czuppon | 423/359 |
| 6,237,545 B1 | | 5/2001 | Barnett et al. | 122/235.23 |
| 6,955,797 B1 | * | 10/2005 | Speth | 423/360 |
| 2002/0031455 A1 | * | 3/2002 | Hippel et al. | 422/173 |
| 2003/0027096 A1 | | 2/2003 | Barnett et al. | 432/180 |
| 2004/0192989 A1 | * | 9/2004 | Espinoza et al. | 585/638 |

* cited by examiner

*Primary Examiner*—Wayne A. Langel
(74) *Attorney, Agent, or Firm*—KBR IP Legal

(57) ABSTRACT

Ammonia is produced in a reactor 22, 24, 246, 248, 250 or 252, in which pseudoisothermal conditions can be approached by convective cooling of a reaction zone of the reactor by positioning at least a portion of the reaction zone in indirect contact with a flow of hot gas such as exhaust gas 18 or preheated air. The hot gas 18 may be supplied from a fired heater, a boiler 10, a reformer 202, a process air preheat furnace, a gas turbine, or the like. The reactor converts a feed stream of a purge gas 12 or syngas to ammonia. The method may be implemented in a primary synthesis loop (as at 246, 248, 250, 252) or in a purge gas loop 12 of a new ammonia plant, or by retrofitting an existing ammonia plant. Cooperatively installed with a primary ammonia synthesis loop, the reactor increases total ammonia production.

15 Claims, 5 Drawing Sheets

PSEUDOISOTHERMAL AMMONIA PROCESS

BACKGROUND OF THE INVENTION

This invention relates to a method for converting a feed stream of nitrogen and hydrogen to ammonia in one or more ammonia synthesis reactors located in a flow of exhaust gas from a hot gas source to provide heat transfer to the exhaust gas for pseudoisothermal operation.

Ammonia is commonly manufactured by reacting synthesis gas (syngas) components nitrogen and hydrogen in an ammonia synthesis loop including a compressor, an ammonia synthesis reactor, ammonia condensation and recovery units, and purge gas recovery. After a pass through the ammonia synthesis reactor, the unreacted synthesis gas components are typically recovered and recycled to the compressor and the reactor in a loop. Make-up synthesis gas is continuously added to the ammonia synthesis loop to provide fresh hydrogen and nitrogen.

Synthesis gas typically contains inert components introduced with the make-up syngas, including argon, methane, carbon dioxide, and others, that do not contribute to ammonia production and undesirably accumulate in the loop. Therefore, a purge gas stream is usually taken from the ammonia synthesis loop to avoid an excessive concentration of the inerts in the loop. The purge stream is typically processed in a hydrogen recovery unit, yielding a waste gas stream and a hydrogen-enriched stream for recycle to the ammonia synthesis loop. The waste gas stream comprises principally nitrogen with minor amounts of carbon dioxide, methane, hydrogen, and argon. In some cases, the waste gas can be used as a low heating value fuel gas.

A significant technological advance in the manufacture of ammonia has been the use of highly active synthesis catalysts comprising a platinum group metal such as ruthenium on a graphite-containing support, as described in U.S. Pat. Nos. 4,055,628, 4,122,040 and 4,163,775. Also, reactors have been designed to use this more active catalyst, such as a catalytic reactor bed disclosed in U.S. Pat. No. 5,250,270. Other ammonia synthesis reactors include those disclosed in U.S. Pat. Nos. 4,230,669, 4,696,799, and 4,735,780.

Ammonia synthesis schemes have also been developed based on the highly active synthesis catalyst. U.S. Pat. No. 4,568,530 discloses reacting a stoichiometrically hydrogen-lean synthesis gas in an ammonia synthesis reactor containing a highly active catalyst in the synthesis loop.

U.S. Pat. No. 4,568,532 discloses an ammonia synthesis reactor, based on a highly active catalyst, installed in series in the ammonia synthesis loop downstream from a reactor containing a conventional iron-based synthesis catalyst.

U.S. Pat. No. 4,568,531 discloses introducing a purge stream from a primary synthesis loop into a second synthesis loop using a more active synthesis catalyst to produce additional ammonia from the purge stream. Another purge stream, significantly reduced in size, is taken from the second synthesis loop to avoid an excessive buildup of inerts. The second synthesis loop, like the primary ammonia synthesis loop, employs a recycle compressor to recycle synthesis gas to the active catalyst reactors in the second synthesis loop.

U.S. Pat. No. 6,171,570 discloses converting hydrogen and nitrogen into additional ammonia from a purge stream from an ammonia synthesis loop, using an ammonia synthesis reactor that does not require staged cooling. In particular, ammonia synthesis loop purge gas is provided to an inlet of a shell and tube reactor having an ammonia synthesis catalyst on the tube-side, while boiler feedwater (BFW) is supplied to the shell-side of the reactor to provide cooling and/or to generate steam.

U.S. Patent Application Publication 20030027096, Barnett et al., now U.S. Pat. No. 6,818,028, describes a method to increase reforming furnace efficiency by preheating a reagent stream and generating synthesis gas in catalytic reactors heated in radiant, transition, and convective sections of a steam-methane reforming furnace.

Patents and publications referred to herein are hereby incorporated by reference in their entireties.

SUMMARY

This invention relates to the production of ammonia from synthesis gas in at least one reactor while maintaining pseudoisothermal conditions using preheated air or exhaust gas as the cooling medium to carry away the exothermic heat of the ammonia synthesis reaction and heat the air or exhaust gas. The cooling is achieved by positioning at least a portion of a reaction zone in an exhaust duct or air preheat duct. The hot gas may be supplied from a variety of process equipment including a fired heater, a boiler, a reformer, a process air preheat furnace (including preheated air or flue gas), a gas turbine, or the like. The invention can be implemented in a new ammonia plant or by retrofitting an existing ammonia plant. It can also be used in a primary ammonia synthesis loop or in secondary synthesis from a purge gas stream.

This invention provides features and capabilities not available together in other methods: (a) an ammonia syngas or synthesis purge gas syngas is reacted so as to maximize productivity and minimize demand for makeup syngas per unit output of ammonia; (b) a pseudoisothermal condition in the synthesis reactor maximizes synthesis conversion; (c) the pseudoisothermal condition in the reactor minimizes space velocities, which help to maximize efficiency of catalyst utilization; (d) converting purge gas to additional ammonia minimizes the amount of waste gas and the size of waste gas processing equipment, and/or debottlenecks waste gas treatment where this is a limitation on ammonia production; (e) converting purge gas at pressures near primary synthesis pressures facilitates recycling unreacted effluent to reforming; and/or (f) a plurality of high-pressure, heat-generating synthesis reactors and heat-consuming recovery units can be arrayed in an exhaust gas stream wherein heat duties can be interchanged in a simplified mechanical design and potential process stream leakage poses substantially minimized risk of cross-contamination.

In one embodiment the present invention provides a process for converting a feed stream of nitrogen and hydrogen to ammonia. The process includes supplying the feed stream to an inlet of a pseudoisothermal ammonia synthesis reactor having a reaction zone comprising a plurality of catalyst tubes positioned in indirect heat exchange relationship with a gas stream in a hot gas duct of a combustion unit to maintain the reaction zone between 300° C. and 650° C. The nitrogen and hydrogen are reacted in the reaction zone to form a product stream having an increased ammonia content relative to the feed stream. The product stream is recovered from an outlet of the reactor.

A temperature rise between the inlet and outlet is desirably less than 80° C., more desirably less than 55° C. The reaction zone is desirably maintained at a temperature from 370° C. to 480° C. The catalyst tubes can have an extended surface. The feed stream can comprise from 50 to 75 volume percent hydrogen and from 25 to 40 volume percent nitrogen.

The feed stream can be purge gas from a primary ammonia synthesis loop. The process can also include water washing the product gas stream to remove ammonia and recover an ammonia-lean stream, and injecting the ammonia-lean stream into feed to a reformer, desirably upstream of a mixed feed coil in a primary reformer. The process can further include dehydrating the purge gas from the primary ammonia synthesis loop, supplying a first portion of the dehydrated purge gas as the feed stream to the ammonia synthesis reactor, supplying a second portion of the ammonia-lean gas stream to hydrogen recovery to obtain a hydrogen-rich stream, and recycling the hydrogen-rich stream to the primary ammonia synthesis loop.

The catalyst can be magnetite or a high activity catalyst such as a platinum-group metal. The combustion unit can be a fired heater, boiler, reformer, air preheat furnace, or gas turbine. The hot gas can be exhaust from any of these combustion units, or preheated air from an air preheat furnace.

The process can also include heating a process stream in a heat recovery unit in communication with the hot gas duct to contact the hot gas downstream from the ammonia synthesis reactor. The process can include arraying a plurality of synthesis reactors and a plurality of heat recovery units in communication with the hot gas duct to alternatingly in series indirectly reject and recover heat from the synthesis reactors and heat recovery units, respectively, using the hot gas as a common heat transfer medium.

In another embodiment, the invention provides a pseudoisothermal synthesis unit for converting nitrogen and hydrogen in a feed stream to ammonia. The synthesis unit includes means for supplying the feed stream to an inlet of a pseudoisothermal ammonia synthesis reactor having a reaction zone comprising a plurality of catalyst tubes positioned in indirect heat exchange relationship with a gas stream in a hot gas duct of a combustion unit to maintain the reaction zone between 300° C. and 650° C. Means are provided for reacting the nitrogen and hydrogen in the reaction zone to form a product stream having an increased ammonia content relative to the feed stream. The synthesis unit also includes means for recovering the product stream from an outlet of the reactor.

Another embodiment of the invention provides a pseudoisothermal synthesis unit for converting nitrogen and hydrogen in a feed stream to ammonia. The unit includes an ammonia synthesis reactor having a reaction zone to convert the feed stream to ammonia, an inlet to introduce the feed stream into the reactor, a combustion unit having a hot gas duct in communication with the reaction zone to contact the reaction zone with a hot gas stream to indirectly transfer heat with the reaction zone, and an outlet to discharge a product stream from the reactor. The reaction zone can include a plurality of reactor tubes and at least one catalyst, which can be selected from the group consisting of magnetite, platinum-group metals, combinations thereof, and the like. The combustion unit can be selected from a fired heater, boiler, reformer, process air preheat furnace, or gas turbine. The synthesis unit can have an array including a plurality of ammonia synthesis reactors and heat recovery units in communication with the hot gas duct to alternatingly in series reject and recover heat indirectly between reactors and heat recovery units, respectively. An ammonia recovery system can be connected to the outlet including a product cooler, a product scrubber, and a scrubbing liquor stripper.

Another embodiment provides a method for converting an original ammonia plant to a converted ammonia plant. The method is applicable to original ammonia plants having a primary synthesis loop with a primary ammonia synthesis converter for converting synthesis gas to ammonia, and an ammonia recovery section for separating ammonia vapor from a purge gas from the primary synthesis loop comprising hydrogen, nitrogen and inerts. A secondary ammonia synthesis loop is installed for reacting a feed stream to form ammonia including an ammonia synthesis reactor comprising catalyst and having a respective reaction zone in communication with a hot gas duct of a combustion unit to contact a hot gas stream as a heat transfer medium. A portion of the purge gas is diverted to the secondary ammonia synthesis loop to form a secondary ammonia product stream. The secondary ammonia synthesis loop can include a cooler and a condenser to separate an ammonia-rich stream from the secondary ammonia product stream and form a residual gas stream for recycle to reformer feed.

DETAILED DESCRIPTION OF THE INVENTION

Figure 1:
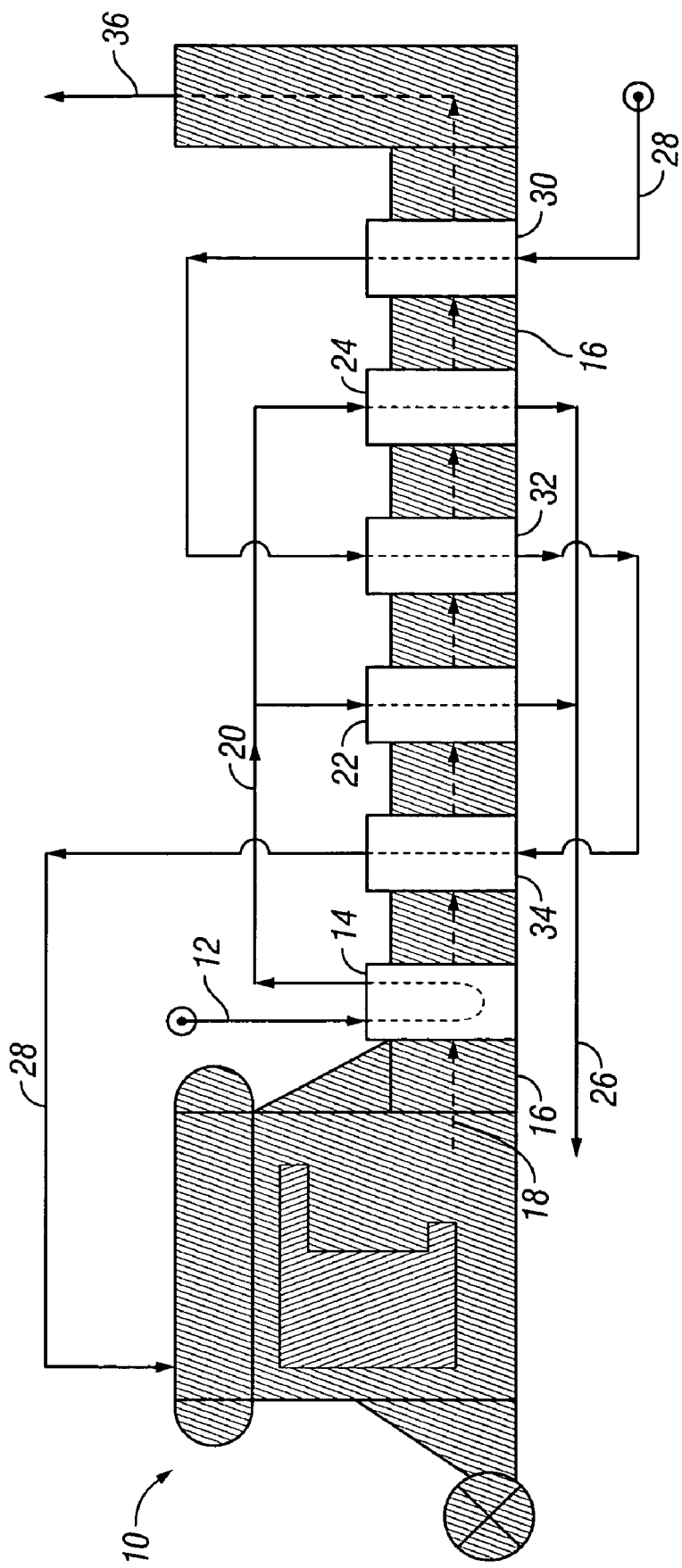
FIG. 1 is a schematic for the conversion of hydrogen and nitrogen in parallel reactors positioned in series in the flow of an exhaust gas stream from a package boiler.

The present invention provides a process to convert nitrogen and hydrogen to ammonia. An exothermic catalytic reactor is placed in a hot gas duct of a combustion unit, for example a gas turbine, package boiler, air preheater, primary reformer, or any other fired heater or equipment that may be available. Heat is transferred from the ammonia reactor to heat the hot gas, such that pseudoisothermal reaction conditions can be approached in the reactor, for example the temperature increase of the reactants between the inlet and outlet of the reactor can be limited to less than 100° C.

The feed stream of hydrogen and nitrogen is supplied to an inlet of at least one ammonia synthesis reactor comprising a plurality of catalyst-containing reactor tubes. The feed stream passes through the synthesis reactor tubes, to form a product gas having increased ammonia content relative to the feed stream. The synthesis reaction is exothermic. The reactor tubes penetrate the hot gas duct such that the hot gas flows across the reactor tubes, dissipating reaction heat into the hot gas and maintaining pseudoisothermal reactor conditions. The heat imparted to the combustion unit gas can be recovered by heating boiler feed water (BFW) for steam generation, preheating combustion air or a feed stream to a synthesis gas reactor, heating a process stream, or the like, using heat recovery equipment typically found in hot gas ducts associated with the combustion unit.

By operating at a nearly constant temperature, the reaction has a closer approach to equilibrium, which in turn requires less catalyst for the reaction. In addition, the dissipation of heat decreases the chances for hot spots in the reactor and prolongs catalyst life.

Additionally, unlike conventional shell-and-tube synthesis reactor systems, the present method allows any leaks from duct-installed synthesis reactor tubes, steam coils, and process heat exchangers or BFW coils to pass into the exhaust gas and be controlled or vented. This substantially minimizes any risk of cross-contamination between process streams. Moreover, since boiler feedwater at elevated pressure is not used as a reactor-cooling medium in contact with the reactor tubes, there is minimal risk of catalyst poisoning from the BFW in the event of a breach of a reactor tube wall.

The feed to the ammonia synthesis reactor can comprise a stream including nitrogen and hydrogen at reactable concentrations, such as a synthesis gas, recycle syngas, or ammonia synthesis loop purge gas.

The catalyst used in the ammonia synthesis reactor can be a conventional ammonia conversion catalyst such as magnetite. Additionally, a high-activity catalyst can be used, such as a catalyst of group VIII, or the platinum group metals, such as ruthenium.

Pseudoisothermal ammonia conversion can be used in a secondary synthesis loop of an ammonia synthesis unit to form ammonia from a purge gas stream from the primary loop. Ammonia production is thereby maximized and waste gas rejection is minimized. Alternatively, pseudoisothermal ammonia conversion can be utilized in a primary ammonia synthesis loop. A plurality of ammonia synthesis reactors can be used in combination, comprising one or more catalysts. For example, a synthesis reactor using a high-activity catalyst can be configured downstream of a reactor containing magnetite catalyst. The magnetite-containing reactor acts as a guard bed for the high-activity catalyst in the downstream reactor. As a result, the high-activity catalyst can be used in a relatively coarse size form, particularly to reduce dynamic pressure drop in the synthesis loop.

As one example, ammonia synthesis reactors can be disposed in the convection section of a hydrocarbon reforming furnace, alone or in combination with a syngas pre-reformer. The pre-reformer, desirably disposed in a transition section of the reforming furnace as described in patent application publication US 20030027096, Feb. 6, 2003, Barnett, et al., now U.S. Pat. No 6,818,028, which is hereby incorporated herein by reference in its entirety, partially cools the exhaust gas through the transition section. At least one synthesis reactor in communication with the reformer convection section further cools the partially cooled exhaust gas leaving the transition section.

Generally, initial design of a plant with a primary ammonia synthesis loop can be configured in cooperative combination with secondary synthesis reaction of the present invention. Secondary synthesis is desirably applied in a purge gas loop to further convert residual nitrogen and hydrogen to additional ammonia. The design methodology of this arrangement is also advantageously applied in the retrofit of an existing ammonia plant having only a primary synthesis loop, or to replace a poorly performing secondary synthesis loop reactor.

In one embodiment as shown in the package boiler 10 seen in FIG. 1, a purge gas feed stream 12 containing nitrogen and hydrogen is heated in exchanger 14 mounted in an exhaust duct 16 for the boiler exhaust gas 18. Preheated feed stream 20 is then fed to catalyst-containing tubes in parallel ammonia synthesis reactors 22, 24. Reactor effluent 26 flows downstream to conventional ammonia recovery (not shown). Boiler feedwater (BFW) is supplied through line 28 successively to BFW heating units 30, 32, and 34. BFW heaters 30, 32 can be positioned downstream from the respective reactors 24, 22 to recover heat from the exhaust gas flow 18 at elevated temperatures. BFW heater 32 thus functions as an interstage cooler between the upstream and downstream reactors 22, 24 so that the temperature conditions, flow rates and conversion rates in the parallel reactors 22, 24 can be essentially equivalent. Cooled exhaust gas 36 flows downstream from the BFW heater 30 for conventional processing.

Reactions in the purge gas synthesis reactors 22, 24 can be constrained to pseudoisothermal conditions by heating the exhaust gas 18 to remove the heat of reaction. The exhaust gas 18 serves as a common heat transfer medium, successively alternating between heat removal from exothermic reactors 22, 24 and heat recovery to the exchangers 14, 30, 32, 34.

The reactors 22, 24 can be designed to specific applications and purposes by taking into account the flow rates of syngas 12 and exhaust gas 18, tube surface area, heat transfer coefficients, stream residence times, dynamic pressure losses, conversion rates, and like design factors. The pseudoisothermal temperature rise ($\Delta T$) in the syngas 12 is desirably less than 80° C., and more desirably less than 50° C. The limits of operating temperature in the synthesis reactors 24 are in general from 300° to 650° C., and desirably from 370° to 480° C. The exhaust gas 18 can have a temperature less than the desired reaction temperature, but the temperature should not be so low that the reaction temperature anywhere in the reactor is less than the syngas feed temperature, taking into account the flow rates of each. Pseudoisothermal conditions and startup can be facilitated by using hot gas for reactor cooling at a minimum temperature of 300° C.

As nitrogen and hydrogen in the feed stream 12 are converted in the reactor tubes 22, 24, ammonia concentration in the stream increases. The purge gas feed stream can have ammonia concentrations in a range of up to 10 volume percent, and the product stream 26 from 10 to 40 volume percent.

The present invention avoids undesirable mechanical design elements seen in conventional synthesis reactors. The present design is rather simple in contrast to conventional ammonia synthesis reactors typically embodying a complex design as a shell-and-tube exchanger wherein synthesis gas passes shell side sequentially through multiple radial and/or axial flow reactor stages housed in a high-pressure vessel for preheating the syngas and interstage cooling of intermediate reactor effluents. In contrast to isothermal operation with boiler feed water as a heat transfer medium employing elevated pressures, such as, for example, from 6.8 to 10.3 MPa, the present invention can use inexpensive low-pressure vessel designs for the heat removal media.

Figure 2:
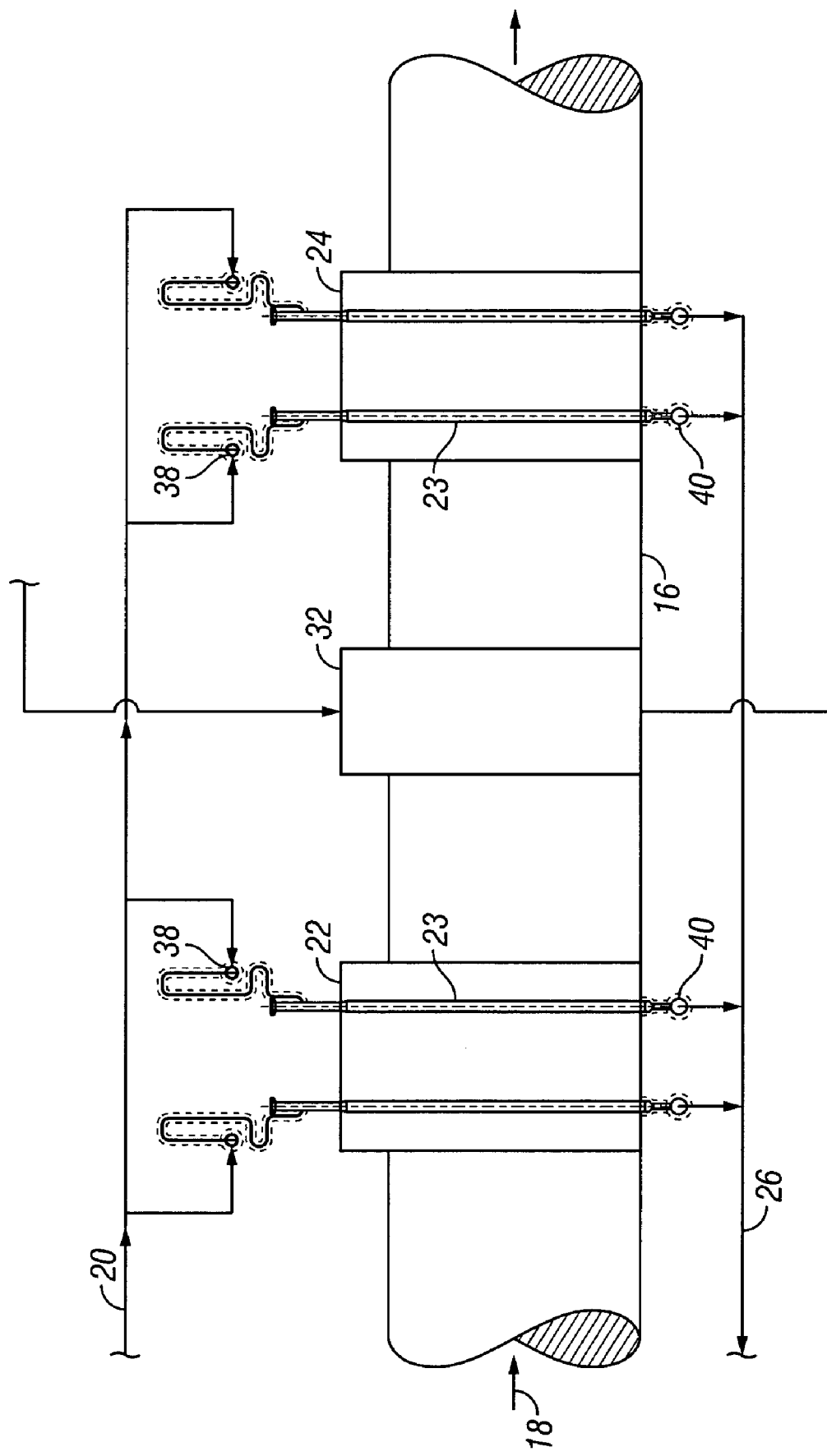
FIG. 2 is an expanded view of section 2 in FIG. 1.

FIG. 2 shows an enlarged vertical arrangement of reactor tubes 23 disposed in two transverse rows within the synthesis reactors 22, 24 installed in the exhaust gas duct 16 of FIG. 1. The number of tubes 23 depends on the desired tube size and design throughput rates of syngas 20. The tubes 23 may be oriented vertically or horizontally, or at oblique angles. In the illustrated embodiment, the tubes 23 are oriented vertically to facilitate catalyst loading and removal. Inlet manifolds 38 distribute the syngas feed stream 20 from a common header into the catalyst-filled tubes 23. Outlet manifold 40 gathers the ammonia-rich effluent exiting the catalyst tubes 23 into product stream 26.

The outlet manifold 40 can support the tubes 23 at lower ends thereof. The outlet manifold 40 can in turn be supported by structural members (not shown) on either side of the ammonia synthesis reactors 22, 24. It is desirable to orient the reactor tubes transversely, e.g. perpendicularly, with respect to the flow of the exhaust gas 18 through the exhaust duct 16 to maximize heat transfer coefficients and improve temperature differences between the syngas and the exhaust gas.

Figure 3:
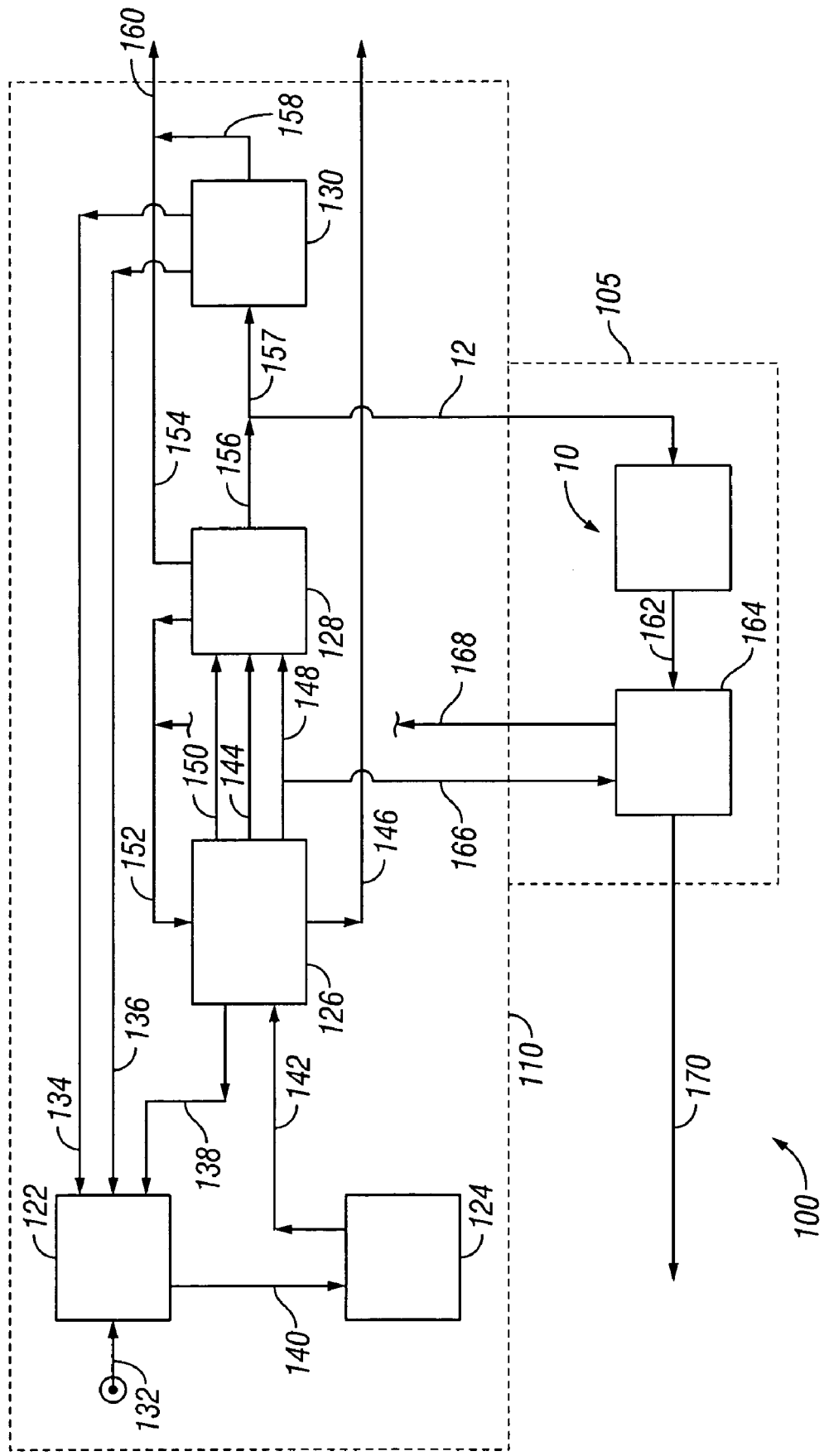
FIG. 3 is a block diagram of a primary synthesis loop configured with a secondary synthesis loop.

FIG. 3 is a schematic for an ammonia plant 100 incorporating secondary ammonia synthesis 105 integrated with a primary ammonia synthesis loop 110. The primary ammonia loop 110 includes syngas compression 122, primary ammonia synthesis 124, ammonia condensation and purification 126, ammonia recovery 128, and hydrogen recovery 130, all of which are generally well known in the art. Briefly, a makeup syngas stream 132 of nitrogen and hydrogen has a purity from about 95 to 100 volume percent, typically from 97.5 to 99.5 volume percent. Compression 122 supplies the makeup syngas 132 and recirculated syngas 138 at a suitable pressure for ammonia synthesis. Syngas stream 140 is directed to primary ammonia synthesis 124, and ammonia-rich product gas 142 flows to unit 126 for nearly isobaric stagewise refrigeration and condensation. Ammonia-lean syngas vapor 138 is recirculated to compression 122 as previously mentioned, and a slipstream 144 of the ammonia-lean syngas vapor is diverted to high-pressure ammonia recovery 128 to separate water vapor and noncondensable gases. Condensate formed in equilibrium with the recycle vapor 138 can be used as makeup refrigerant in the condensation/purification unit 126. The refrigerant cyclically condenses and flashes through a plurality of stages (not shown) within condensation/purification 126, yielding a purified ammonia stream 146, in a manner well known in the art.

A slipstream 148 of partially purified ammonia refrigerant is diverted to ammonia recovery 128 for use as makeup liquid to ammonia distillation. A flashed refrigerant slip stream 150 comprising low-pressure ammonia plus noncondensable gases and other vapor from the refrigeration can be diverted to ammonia recovery 128 to separate water vapor and noncondensable gases. Ammonia recovery 128 returns an upgraded, low-pressure ammonia vapor stream 152 to the refrigeration subsystem. Ammonia recovery 128 produces a low-pressure waste gas stream 154, typically at a low mass flow rate of about 0.1 to 0.5 percent of the mass flow rate of makeup syngas 132.

A high-pressure purge gas stream 156 is taken from ammonia purification 128 to remove inert gases such as argon, carbon dioxide, and methane that accumulate in the primary synthesis loop. A portion 157 of the purge gas 156 is sent to conventional hydrogen recovery 130. The hydrogen is recovered as low-pressure hydrogen stream 134 and high-pressure hydrogen stream 136 that can be recycled with the syngas to compression 122 and ammonia synthesis 124. Waste gas comprising primarily nitrogen, plus argon, carbon dioxide, and methane in minor proportions flows through line 158 and together with waste gas stream 154 to stream 160.

Another portion of the purge gas 156 is supplied as a feed 12 to secondary synthesis 105, which includes a pseudoisothermal converter in package boiler unit 10, as described above in reference to FIGS. 1 and 2, that produces an ammonia-rich effluent for feed to ammonia recovery unit 164, which is described in more detail below in reference to FIG. 4. The secondary recovery 164 imports partially purified ammonia refrigerant 166 from condensation/purification 126 as makeup liquid for ammonia distillation, and returns a high-concentration ammonia vapor stream 168 to stream 152. Ammonia-lean stream 170 comprises nitrogen and hydrogen and at high pressure, and if desired can be recycled to reformer feed, desirably upstream of a mixed-feed preheat coil.

In operation, the secondary synthesis improves plant productivity by: (1) increasing ammonia production, (2) reducing syngas makeup demand, and (3) reducing purge gas losses. Ammonia conversion in the secondary synthesis can be from about 5 to 20 percent, for example 10 to 15 percent, of the feed 12.

The purge gas stream 157 in a primary ammonia synthesis loop without secondary ammonia conversion typically has a mass flow rate equivalent to about 15 to 25 percent of the mass flow rate of the makeup syngas 132. In contrast, purge gas flowrates obtained by implementing the secondary synthesis of this invention can be reduced in a range of 35 to 65 percent, desirably by about 50 percent. Waste gas 160 is reduced by up to 10 to 15 percent, desirably from 5 to 10 percent. Hydrogen recovery rates via recycle streams 134, 136 remain at about 60 to 80 percent of the hydrogen in the purge gas 157, usually about 70 to 75 percent.

Figure 4:
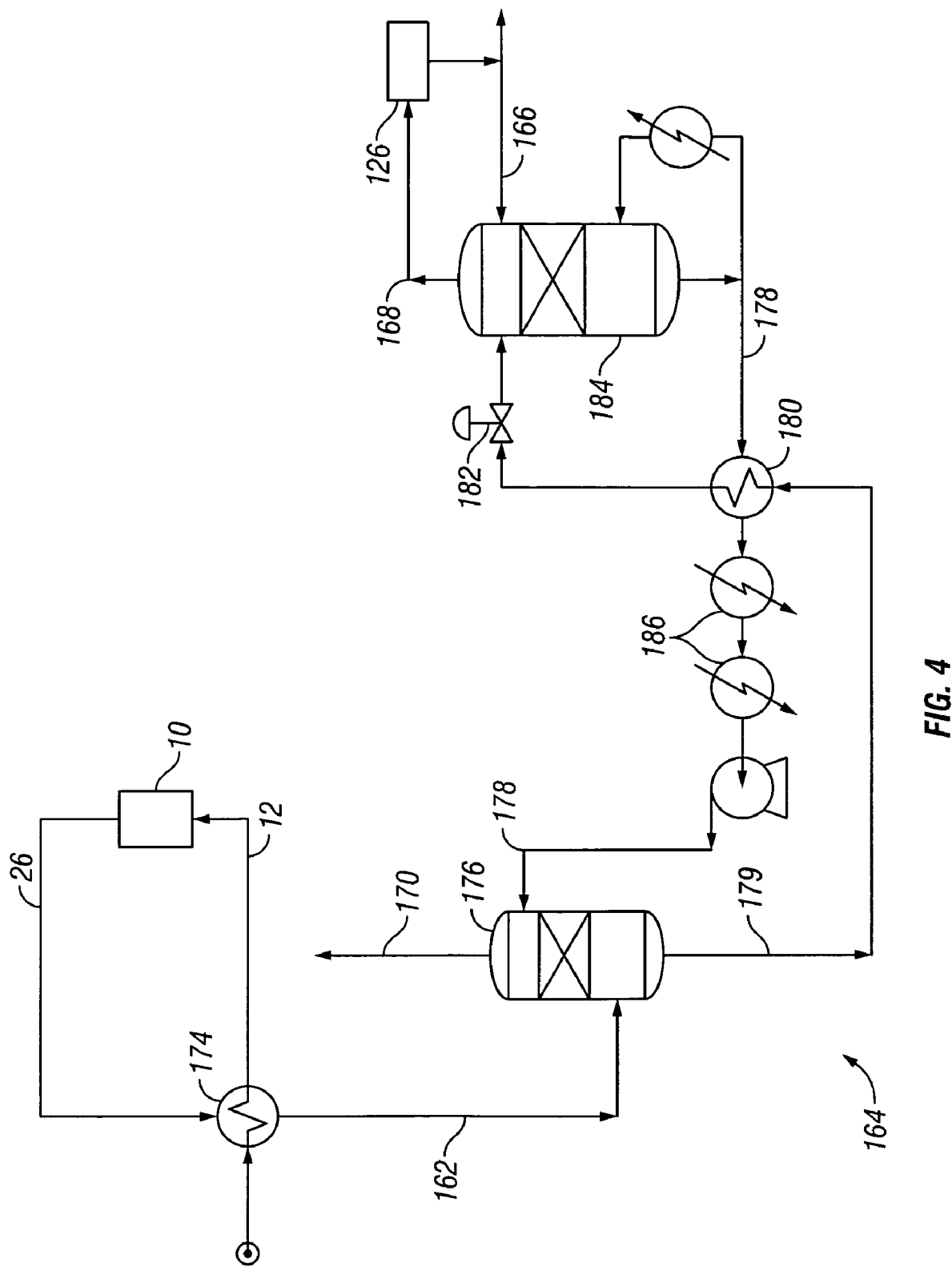
FIG. 4 is a schematic of secondary ammonia synthesis from a purge gas.

With reference to the embodiment shown in FIG. 4, high-pressure purge gas in stream 12 can be heated in cross-exchanger 174 for feed to pseudoisothermal ammonia conversion in the exhaust duct of package boiler 10 (see FIGS. 1-2). Ammonia-enriched effluent stream 26 is cooled in the cross-exchanger 174 and supplied via line 162 to high-pressure scrubber 176 for contact with lean aqueous ammonia liquor stream 178. Ammonia-rich liquor 179 from the scrubber 176 is reheated in cross-exchanger 180, depressurized across valve 182, and fed to distillation column 184. Distillation column 184 is refluxed with partially purified ammonia refrigerant via stream 166, and produces overhead stream 168 comprising high-concentration ammonia vapor returned to condensation/purification 126 (see FIG. 3). The bottoms can be cooled in cross-exchanger 180 and one or more exchangers 186 for recirculation via line 178 to the scrubber 176. Ammonia-lean syngas 170 is discharged overhead from the scrubber 176.

Figure 5:
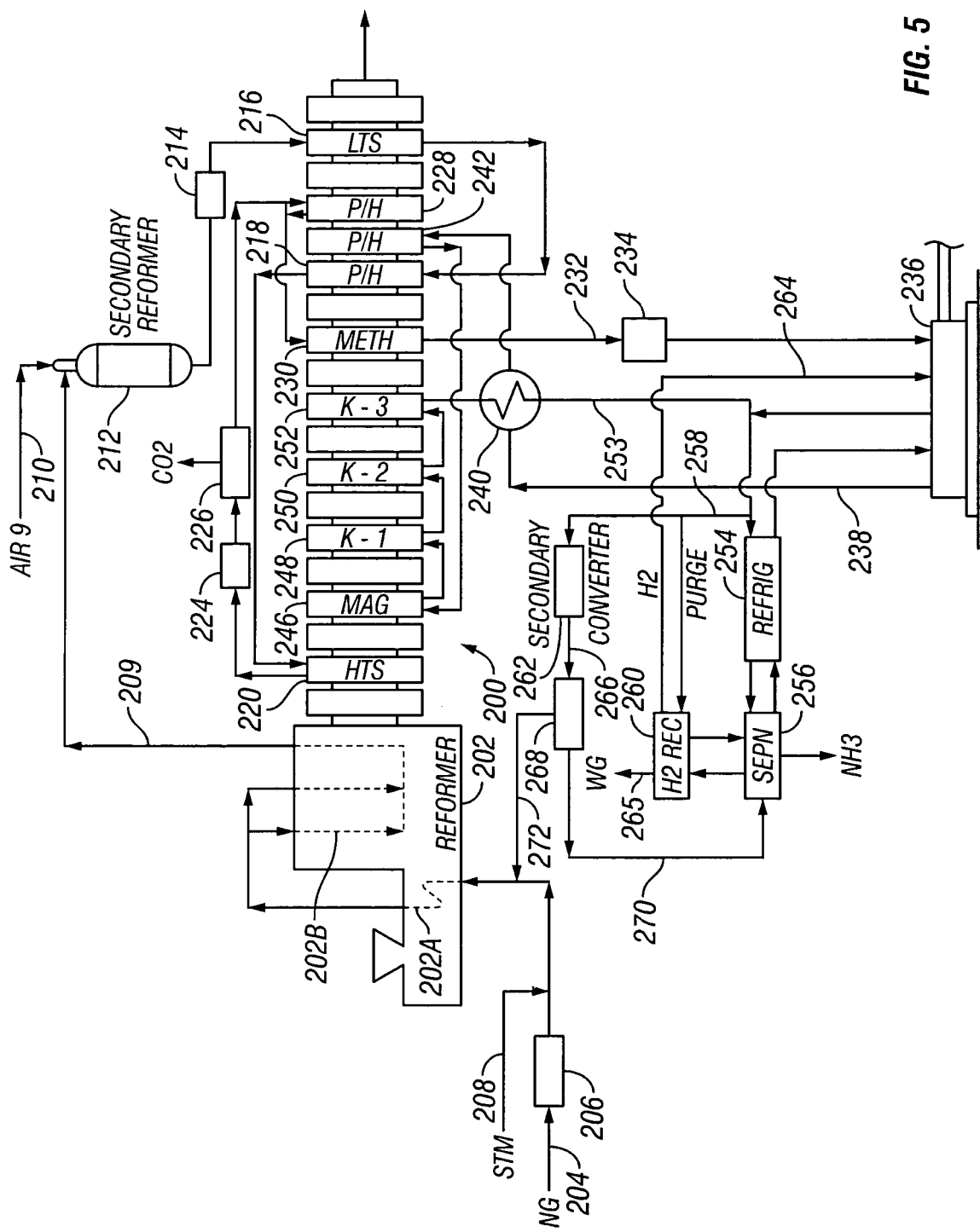
FIG. 5 is a schematic for an ammonia plant with ammonia converters cooled using flue gas from the reformer.

As seen in the embodiment of FIG. 5, both primary and secondary ammonia synthesis reactors can be disposed within the convection section of a flue gas exhaust duct 200 from the fired section of an otherwise conventional steam reformer 202. As is well known in the art, a natural gas stream 204 is passed through sulfur removal unit 206, mixed with steam via line 208, preheated in mixed feed preheater 202A and fed to a plurality of catalyst-filled tubes 202B in the primary reformer 202. The effluent 209 is then fed with air 210 to a conventional secondary reformer 212. The raw syngas is passed through heat recovery unit 214 and low temperature shift converter 216, which can be conveniently disposed in duct 200, to convert CO and water to form additional hydrogen and CO2. Thence, the gas is preheated in exchanger 218 and passed through high temperature shift converter 220 to form additional hydrogen, then to heat recovery unit 224, CO2 removal unit 226, preheater 228, and methanator 230 to form makeup syngas stream 232, which is pressurized in makeup compressor 234 and fed to recycle compressor 236.

Syngas at loop pressure in line 238 is heated in cross-exchanger 240 and preheater 242 disposed in duct 200, and fed to reactor 246 that can contain magnetite catalyst. The reactor 246 is disposed in the duct 200 for cooling by the flue gas medium. The partially converted effluent from reactor 246 is then passed serially though reactors 248, 250, 252 containing high activity catalyst and similarly cooled by the flue gas medium in duct 200. The ammonia-rich effluent 253 is then cooled in the cross exchanger 240 and refrigeration unit 254, and ammonia is recovered from separation unit 256, essentially as described in reference to FIG. 3 above.

A sidestream 258 is taken from line 253 and fed in part to hydrogen recovery unit 260 and in part to secondary converter 262. Hydrogen recovery unit 260 is operated with refrigeration from the separation unit 256 essentially as described in reference to FIG. 3, and recovers a hydrogen stream 264 from the purge stream which is recycled to the compressor 236. A waste gas stream 265 is disposed of as described in FIG. 3 above. The secondary converter 262 is a once-through ammonia converter which can be placed in a hot gas duct of a combustion unit such as package boiler unit 10 (see FIG. 1) and/or duct 200 to produce an ammonia enriched stream 266, which is fed to ammonia stripping unit 268 to recover a concentrated ammonia stream 270 that can be processed in separation unit 256. An ammonia-lean syngas stream 272 can be recycled to the feed to the reformer 202 upstream from the mixed feed preheater 202A.

EXAMPLE 1

Table 1 below provides exemplary tube specifications for the embodiment of the heat transfer units in FIGS. 1 and 2, including the synthesis reactors 22, 24, the BFW heating units 30, 32, 34, and the syngas preheater unit 14. Typically, the inner diameter of catalyst-containing tubes 23 can range from about 7.5 cm to about 10.0 cm, while the outer diameter desirably ranges from about 8.25 cm to about 10.8 cm. The length of the catalyst tubes 23 typically ranges from about 5.0 m to about 8.0 m, depending upon the diameter or other transverse dimension of the exhaust duct 16.

The transverse orientation of the reactor tubes 23 and a relatively high exhaust gas velocity through the exhaust duct 16 may provide a suitably high convective heat transfer coefficient to allow the reactors 22, 24 to use less costly smooth-walled reactor tubes 23. Alternatively, as listed in Table 1, the reactor tubes 23 can use extended surfaces such as fins to enhance heat transfer.

secondary ammonia synthesis. Table 2 provides data for key process streams indicating performance of the base-case plant. Table 3 provides data illustrating performance of an ammonia plant in which the ammonia production from the primary synthesis loop 110 is supplemented with the secondary synthesis 105. In the Table 3 process, stream 12 supplies a portion of the purge stream 156 to the secondary synthesis in the modified package boiler unit 10. Without the secondary synthesis 105 in the base-case system of Table 2, the whole purge stream 156 is supplied to hydrogen recovery unit 130.

TABLE 1

Heat Transfer Coil Information

|  | Preheat | BFW 1 | Reactor 1 | BFW 2 | Reactor 2 | BFW 3 |
|---|---|---|---|---|---|---|
| Element ID | 14 | 34 | 22 | 32 | 24 | 30 |
| Coil Material | S/S 304 H | Carbon Steel | S/S 304 H | Carbon Steel | S/S 304 H | Carbon Steel |
| Tube OD (cm) | 8.89 | 5.08 | 8.89 | 5.08 | 8.89 | 5.08 |
| Min. Wall (cm) | 0.665 | 0.318 | 0.665 | 0.318 | 0.665 | 0.318 |
| Tubes per Row | 11 | 16 | 11 | 16 | 11 | 16 |
| Tube Rows | 4 | 2 | 12 | 1 | 12 | 12 |
| Passes | 11 | 16 | 132 | 16 | 132 | 16 |
| Spacing, Centers × Rows (cm) | 6.5 × 5.63 | 4.5 × 3.9 | 6.5 × 5.63 | 4.5 × 3.9 | 6.5 × 5.63 | 4.5 × 3.9 |
| Fin Material | S/S 410 | Carbon Steel | S/S 410 | Carbon Steel | S/S 410 | Carbon Steel |
| Fins/cm | 1.58 | 2.37 | 1.58 | 2.37 | 1.58 | 2.37 |
| Fin Height × Thickness (cm) | 1.905 × 0.127 | 1.746 × 0.127 | 1.905 × 0.127 | 1.746 × 0.127 | 1.905 × 0.127 | 1.746 × 0.127 |

EXAMPLE 2

This example compares the performance of an ammonia plant using the secondary synthesis loop in an embodiment of the present invention as in FIGS. 1-4, relative to performance of a stand-alone "base-case" ammonia plant, without any A comparison of Tables 2 and 3 shows that total ammonia production with secondary conversion increases by about 5 percent over the base case, while waste gas flow is reduced by about 8 percent. The makeup syngas feed increases compared to the base case, due to the recycle of unreacted syngas from the secondary conversion into the mixed feed for reforming.

TABLE 2

Base Case Ammonia Plant Without Secondary Synthesis

| Stream Description Stream: | Makeup Syngas 132 | LP H2 Recycle 134 | Reactor Product 142 | HP H2 Recycle 136 | Recycle Gas 138 | Purge Feed 156 | Split to 2° Synthesis 157 | Syngas from 2° Synthesis 170 | NH₃ Product 146 | Waste Gas 160 |
|---|---|---|---|---|---|---|---|---|---|---|
| Composition (Dry Mole %) | | | | | | | | | | |
| H2 | 71.04 | 77.94 | 48.34 | 81.15 | 57.2 | 58.96 | | | 0 | 8.67 |
| N2 | 27.77 | 20.68 | 27.88 | 17.3 | 32.98 | 33.99 | | | 0 | 71.47 |
| CH4 | 0.85 | 0.55 | 3.93 | 0.74 | 4.64 | 4.76 | | | 0 | 14.27 |
| AR | 0.33 | 0.82 | 1.86 | 0.81 | 2.20 | 2.26 | | | 0 | 5.60 |
| NH3 | 0 | 0 | 18 | 0 | 2.99 | 0 | | | 100 | 0 |
| Dry Flow (kg-mol/h) | 9,860 | 114 | 29,307 | 1,217 | 22,798 | 1,897 | | | 4,594 | 584 |
| Dry Flow (kg/h) | 93,503 | 887 | 387,452 | 8,431 | 285,482 | 23,496 | | | 78,232 | 14,427 |
| H2O (kg-mol/h) | 0.0 | 0.0 | 0.0 | 0.0 | 0.0 | 0.8 | | | 0.6 | 0.0 |
| Total Flow (kg-mol/h) | 9,860 | 114 | 29,307 | 1,217 | 22,798 | 1,898 | | | 4,594 | 584 |
| Total Flow (kg/h) | 93,503 | 887 | 387,452 | 8,431 | 285,482 | 23,511 | | | 78,241 | 14,429 |
| Temperature (° C.) | 4 | 19 | 453 | 17 | 25 | 24 | | | −33 | 23 |
| Pressure (MPa) | 3.58 | 3.65 | 8.86 | 8.49 | 8.58 | 8.52 | | | 0.39 | 0.34 |
| Density (g/cm3) | 0.015 | 0.012 | 0.019 | 0.023 | 0.042 | 0.041 | | | 0.68 | 0.004 |
| Average MW | 9.4 | 7.8 | 13.2 | 6.9 | 12.5 | 12.4 | | | 17.0 | 24.8 |

TABLE 3

Ammonia Plant With Secondary Synthesis

| Stream Description Stream: | Makeup Syngas 132 | LP H2 Recycle 134 | Reactor Product 142 | HP H2 Recycle 136 | Recycle Gas 138 | Purge Feed 156 | Split to 2° Synthesis 157 | Syngas from 2° Synthesis 170 | NH3 Product 146 | Waste Gas 160 |
|---|---|---|---|---|---|---|---|---|---|---|
| | | | | Composition (Dry Mole %) | | | | | | |
| H2 | 69.60 | 78.40 | 48.7 | 80.35 | 57.78 | 59.55 | 59.55 | 56.06 | 0 | 8.95 |
| N2 | 28.58 | 20.88 | 27.87 | 17.82 | 33.06 | 34.08 | 34.08 | 36.07 | 0 | 72.84 |
| CH4 | 1.14 | 1.14 | 3.17 | 0.56 | 3.76 | 3.88 | 3.88 | 4.73 | 0 | 11.88 |
| AR | 0.68 | 0.68 | 2.05 | 0.93 | 2.43 | 2.5 | 2.5 | 3.06 | 0 | 6.32 |
| NH3 | 0.0 | 0.0 | 18.2 | 0.34 | 2.99 | 0 | 0 | 0.07 | 100 | 0.01 |
| Dry Flow (kg-mol/h) | 11,819 | 108 | 29,100 | 1,167 | 20,788 | 1,787 | 1,834 | 1,500 | 4,840 | 528 |
| Dry Flow (kg/h) | 116,562 | 857 | 384,630 | 8,269 | 259,999 | 22,106 | 22,680 | 19,845 | 82,428 | 13,215 |
| H2O (kg-mol/h) | 3.0 | 0.0 | 0.0 | 0.0 | 0.0 | 0.0 | 0.0 | 7.7 | 0.6 | 0.0 |
| Total Flow (kg-mol/h) | 11,822 | 105 | 29,100 | 1,167 | 20,788 | 1,787 | 1,834 | 1,508 | 4,840 | 528 |
| Total Flow (kg/h) | 116,616 | 803 | 384,630 | 8,269 | 259,999 | 22,106 | 22,680 | 19,984 | 82,437 | 13,215 |
| Temperature (° C.) | −1 | 17 | 455 | 17 | −23 | 25 | 25 | 72 | −33 | 25 |
| Pressure (MPa) | 3.62 | 3.65 | 8.86 | 8.48 | 8.64 | 8.49 | 7.93 | 7.58 | 0.39 | 0.25 |
| Density (g/cm3) | 0.015 | 0.012 | 0.019 | 0.025 | 0.051 | 0.041 | 0.041 | 0.034 | 0.677 | 0.002 |
| Average MW | 9.9 | 7.9 | 13.2 | 7.1 | 12.5 | 12.4 | 12.4 | 13.3 | 17.0 | 25.0 |

EXAMPLE 3

Table 4 presents one embodiment of operating conditions in a series of synthesis reactors and process heat exchangers in the exhaust duct 16 of a package boiler 10 as in FIG. 1. A syngas preheater 14, two ammonia synthesis reactors 22, 24, and three BFW heaters 30, 32, 34 can be alternatingly arrayed in the exhaust duct 16 for heat rejection and recovery. The conditions correspond to the process of Table 3 in the operating configuration of Example 2 and FIG. 3.

TABLE 4

Package Boiler-Secondary Ammonia Converter Operation

| | | Temperature (° C.) | | | | Pressure Drop | |
|---|---|---|---|---|---|---|---|
| | | Process Fluid | | Exhaust Gas | | Process Fluid | Exhaust Gas |
| Process Unit | Heat Duty (MJ/h) | inlet | outlet | inlet | outlet | kPa | mm Hg |
| Syngas Preheater 14 | 1,772 | 382 | 413 | 434 | 423 | 4.1 | 1.15 |
| BFW Heater 34 | 9,514 | 207 | 224 | 423 | 366 | 7.5 | 0.59 |
| Reactor 22 | 4,820 | 413 | 413 | 366 | 395 | n/a | 3.19 |
| BFW Heater 32 | 4,304 | 199 | 207 | 395 | 369 | 3.5 | 0.30 |
| Reactor 24 | 4,504 | 413 | 413 | 369 | 396 | n/a | 3.20 |
| BFW Heater 30 | 35,948 | 130 | 198 | 396 | 173 | 44.8 | 2.75 |

The invention is described above with reference to non-limiting examples provided for illustrative purposes only. Various modifications and changes will become apparent to the skilled artisan in view thereof. It is intended that all such changes and modifications within the scope and spirit of the appended claims be embraced thereby.

The invention claimed is:

1. A process for converting a feed stream of nitrogen and hydrogen to ammonia comprising:
supplying the feed stream comprising nitrogen and hydrogen to an inlet of an ammonia synthesis reactor having a reaction zone comprising a plurality of catalyst-containing tubes positioned in indirect heat exchange with a gas stream in a hot gas dud of a combustion unit to maintain the reaction zone between 300° C. and 650° C.;
reacting the nitrogen and hydrogen in the reaction zone to form a product stream having an increased ammonia content relative to the feed stream; and
recovering the product stream from an outlet of the reactor.

2. The process of claim 1 comprising a temperature rise between the inlet and outlet less than 80° C.

3. The process of claim 2 wherein the temperature rises less than 55° C.

4. The process of claim 3 wherein the reaction zone is maintained at a temperature from 370° C. to 480° C.

5. The process of claim 1, wherein the catalyst-containing tubes have extended surfaces.

6. The process of claim 1 wherein the feed stream comprises from 50 to 75 volume percent hydrogen and from 25 to 40 volume percent nitrogen.

7. The process of claim 6 wherein the feed stream comprises purge gas from a primary ammonia synthesis loop.

8. The process of claim 7 further comprising water washing the product gas stream to remove ammonia and recover an ammonia-lean stream, and injecting the ammonia-lean stream upstream of a mixed feed coil in a primary reformer.

9. The process of claim 8 further comprising:
dehydrating the purge gas from the primary ammonia synthesis loop;
supplying a first portion of the dehydrated purge gas as the feed stream to the ammonia synthesis reactor;
supplying a second portion of the dehydrated purge gas stream to hydrogen recovery to obtain at least one hydrogen-rich stream;
recycling any one of the hydrogen-rich streams to the primary ammonia synthesis loop.

10. The process of claim 1, wherein the catalyst comprises magnetite.

11. The process of claim 1, wherein the catalyst comprises a platinum-group metal.

12. The process of claim 1, wherein the combustion unit comprises a fired heater, boiler, reformer, air preheat furnace, or gas turbine, and the hot gas comprises exhaust.

13. The process of claim 1 wherein the combustion unit comprises an air preheat furnace and the hot gas comprises preheated air.

14. The process of claim 1, further comprising heating a process stream in a heat recovery unit in communication with the hot gas duct by indirectly exchanging heat between the process stream and the gas stream downstream from the ammonia synthesis reactor.

15. The process of claim 1 further comprising arraying a plurality of synthesis reactors and a plurality of heat recovery units in communication with the hot gas duct to successively and alternatingly indirectly reject and recover respective heat duties from synthesis reactors and heat recovery units using the hot gas as common heat transfer medium.

* * * * *